(12) United States Patent  
Asari

(10) Patent No.: US 11,113,555 B2  
(45) Date of Patent: Sep. 7, 2021

(54) OBJECT DETECTION APPARATUS, TRAFFIC MONITORING SYSTEM, METHOD OF CONTROLLING AN OBJECT DETECTION APPARATUS AND PROGRAM

(71) Applicant: NEC Corporation, Tokyo (JP)

(72) Inventor: Toshiyuki Asari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 16/491,227

(22) PCT Filed: Mar. 22, 2018

(86) PCT No.: PCT/JP2018/011273  
§ 371 (c)(1),  
(2) Date: Sep. 5, 2019

(87) PCT Pub. No.: WO2018/174123  
PCT Pub. Date: Sep. 27, 2018

(65) Prior Publication Data  
US 2020/0026945 A1 Jan. 23, 2020

(30) Foreign Application Priority Data  
Mar. 23, 2017 (JP) .............................. JP2017-058003

(51) Int. Cl.  
*G06K 9/20* (2006.01)  
*G06K 9/00* (2006.01)

(52) U.S. Cl.  
CPC ....... *G06K 9/2054* (2013.01); *G06K 9/00785* (2013.01)

(58) Field of Classification Search  
CPC ........... G06K 2209/23; G06K 9/00369; G06K 9/00785; G06K 9/00993; G06K 9/2054; G06K 9/6227  
See application file for complete search history.

(56) References Cited

U.S. PATENT DOCUMENTS 8,768,048 B1 7/2014 Kwatra et al.  
8,918,277 B2 * 12/2014 Niem ............... G08G 1/096716  
701/409

(Continued)

FOREIGN PATENT DOCUMENTS

JP 2005-322220 A 11/2005  
JP 2007-329762 A 12/2007

(Continued)

OTHER PUBLICATIONS

International Search Report for PCT Application No. PCT/JP2018/011273, dated Jun. 19, 2018.

*Primary Examiner* — Andrae S Allison  
(74) *Attorney, Agent, or Firm* — Sughrue Mion, PLLC

(57) ABSTRACT

An object detection apparatus is provided with a discriminator applier and a candidate area calculator. The discriminator applier applies a discriminator which detects an object to images acquired in past and calculates object detection information including at least location information of the object detected by the discriminator, in a learning phase. The candidate area calculator performs a machine-learning by use of the object detection information and calculates object candidate area information including at least information specifying a candidate area in which the object may appear in an image.

17 Claims, 22 Drawing Sheets

(56) References Cited

U.S. PATENT DOCUMENTS

| | | | |
|---|---|---|---|
| 8,948,954 B1 * | 2/2015 | Ferguson | B60W 30/12 701/23 |
| 10,318,827 B2 * | 6/2019 | Jia | G06N 3/0454 |
| 10,899,345 B1 * | 1/2021 | Ferguson | B60W 30/0953 |
| 2005/0238217 A1 | 10/2005 | Enomoto et al. | |
| 2010/0086213 A1 | 4/2010 | Momoi et al. | |
| 2014/0067187 A1 * | 3/2014 | Ferguson | B60W 30/12 701/28 |
| 2015/0293216 A1 * | 10/2015 | O'Dea | G01S 13/87 701/23 |
| 2016/0327947 A1 * | 11/2016 | Ishikawa | B60W 50/14 |
| 2016/0334230 A1 * | 11/2016 | Ross | G01C 21/3415 |
| 2019/0294896 A1 * | 9/2019 | Jia | G06K 9/00369 |

FOREIGN PATENT DOCUMENTS

| | | | |
|---|---|---|---|
| JP | 2010-086482 A | 4/2010 | |
| JP | 2011-060221 A | 3/2011 | |
| JP | 2013-092955 A | 5/2013 | |
| JP | 2013-171319 A | 9/2013 | |
| WO | 2012/046426 A1 | 4/2012 | |

* cited by examiner

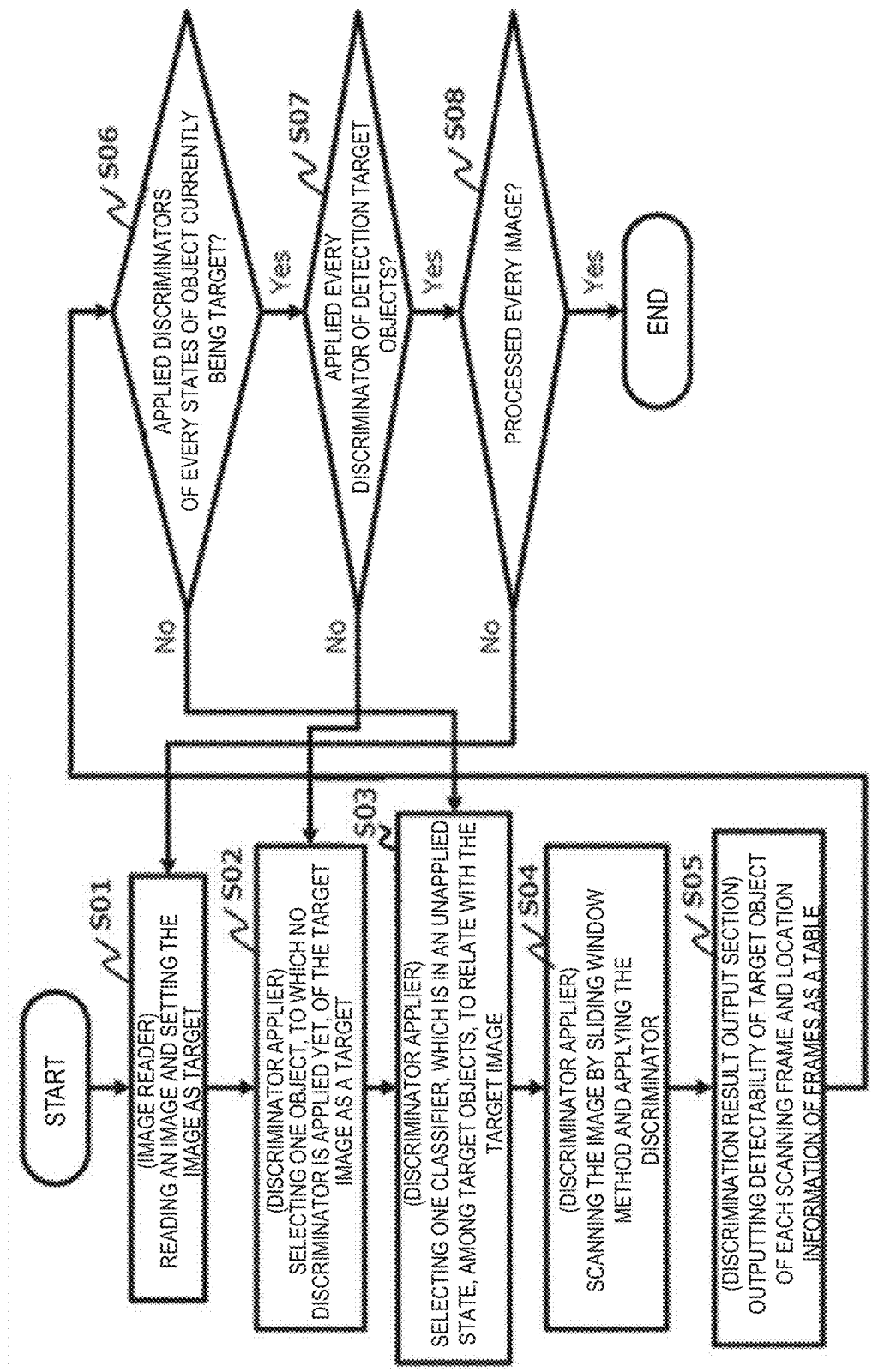

FIG. 7

OBJECT DETECTING INFORMATION

| CAMERA ID | IMAGE ID | SHOOTING DATE AND TIME | OBJECT | STATE | DETECTABILITY | COORDINATES (HORIZONTAL, VERTICAL) |
|---|---|---|---|---|---|---|
| 0001 | 00000001 | 2001/01/01 12:00:00.000 | AUTOMOBILE | OVERALL, DIRECTED TO LEFT | × | (0,0) |
| 0001 | 00000001 | 2001/01/01 12:00:00.000 | AUTOMOBILE | OVERALL, DIRECTED TO LEFT | × | (100,0) |
| 0001 | 00000001 | 2001/01/01 12:00:00.000 | AUTOMOBILE | OVERALL, DIRECTED TO LEFT | × | (200,0) |
| 0001 | 00000001 | 2001/01/01 12:00:00.000 | AUTOMOBILE | ... | ... | ... |
| 0001 | 00000001 | 2001/01/01 12:00:00.000 | AUTOMOBILE | OVERALL, DIRECTED TO RIGHT | × | (0,0) |
| 0001 | 00000001 | 2001/01/01 12:00:00.000 | AUTOMOBILE | OVERALL, DIRECTED TO RIGHT | × | (100,0) |
| 0001 | 00000001 | 2001/01/01 12:00:00.000 | AUTOMOBILE | ... | ... | ... |
| 0001 | 00000001 | 2001/01/01 12:00:00.000 | AUTOMOBILE | OVERALL, DIRECTED TO RIGHT | ○ | (300,400) |
| 0001 | 00000001 | 2001/01/01 12:00:00.000 | AUTOMOBILE | ... | ... | ... |
| 0001 | 00000001 | 2001/01/01 12:00:00.000 | TRUCK | OVERALL, DIRECTED TO LEFT | × | (0,0) |
| 0001 | 00000001 | 2001/01/01 12:00:00.000 | TRUCK | ... | ... | ... |
| 0001 | 00000001 | 2001/01/01 12:00:00.000 | TRUCK | LEFT-HALF, DIRECTED TO LEFT | ○ | (1400,450) |
| 0001 | 00000001 | 2001/01/01 12:00:00.000 | TRUCK | ... | ... | ... |
| 0001 | 00000001 | 2001/01/01 12:00:00.000 | PEDESTRIAN | OVERALL, DIRECTED TO LEFT | × | (0,0) |
| 0001 | 00000001 | 2001/01/01 12:00:00.000 | PEDESTRIAN | ... | ... | ... |
| 0001 | 00000001 | 2001/01/01 12:00:00.000 | PEDESTRIAN | OVERALL, DIRECTED TO RIGHT | ○ | (1100,200) |
| 0001 | 00000001 | 2001/01/01 12:00:00.000 | PEDESTRIAN | ... | ... | ... |
| 0001 | 00000002 | 2001/01/01 12:00:00.500 | AUTOMOBILE | OVERALL, DIRECTED TO LEFT | × | (0,0) |
| 0001 | 00000002 | 2001/01/01 12:00:00.500 | AUTOMOBILE | ... | ... | ... |
| ... | ... | ... | ... | ... | ... | ... |

FIG. 8

OBJECT CANDIDATE AREA INFORMATION

| CAMERA ID | OBJECT | STATE | ABSOLUTE/ RELATIVE | DEPENDENT OBJECT AND/OR STATE | CANDIDATE AREA FORMULA | DOMAIN OF DEFINITION | TIME |
|---|---|---|---|---|---|---|---|
| 00001 | AUTOMOBILE | OVERALL, DIRECTED TO RIGHT | ABSOLUTE | × | h = 600 | 0 <= w <= 1600 | 06:00:00 – 17:00:00 |
| 00001 | AUTOMOBILE | OVERALL, DIRECTED TO LEFT | ABSOLUTE | × | h = 600 | 0 <= w <= 100<br>300 <= w <= 1600 | 06:00:00 – 17:00:00 |
| 00001 | AUTOMOBILE | ⋮ | ⋮ | ⋮ | ⋮ | ⋮ | ⋮ |
| 00001 | AUTOMOBILE | RIGHT-HALF, DIRECTED TO RIGHT | RELATIVE | OVERALL OF A TRUCK DIRECTED TO LEFT | h = 300 | 150 <= w <= 230 | 06:00:00 – 17:00:00 |
| 00001 | AUTOMOBILE | ⋮ | ⋮ | ⋮ | ⋮ | ⋮ | ⋮ |
| 00001 | AUTOMOBILE | OVERALL, DIRECTED TO RIGHT, NIGHT TIME | ABSOLUTE | × | h = 600 | 0 <= w <= 1600 | 00:00:00 – 05:59:59<br>17:00:00 – 23:59:59 |
| 00001 | AUTOMOBILE | ⋮ | ⋮ | ⋮ | ⋮ | ⋮ | ⋮ |
| 00001 | AUTOMOBILE | OVERALL, DIRECTED TO FRONT | ABSOLUTE | × | h = 16w – 9600 | 600 <= w <= 700 | 06:00:00 – 17:00:00 |
| 00001 | AUTOMOBILE | ⋮ | ⋮ | ⋮ | ⋮ | ⋮ | ⋮ |
| 00001 | PEDESTRIAN | OVERALL, DIRECTED TO RIGHT | ABSOLUTE | × | h = 320 | 0 <= w <= 1600 | 06:00:00 – 17:00:00 |
| ⋮ | ⋮ | ⋮ | ⋮ | ⋮ | ⋮ | ⋮ | ⋮ |

FIG. 14

DISCRIMINATOR PARAMETER SETTING INFORMATION

```
[OVERALL]
...
[AUTOMOBILE]
   [SCANNING WIDTH (HORIZONTAL)] = 200, 100, 50
   [SCANNING WIDTH (VERTICAL)] = 100, 50
[PEDESTRIAN]
   [SCANNING WIDTH (HORIZONTAL)] = 80, 40, 20
   [SCANNING WIDTH (VERTICAL)] = 40, 20
[TRUCK]
...
```

FIG. 15

OBJECT DETECTING INFORMATION

| CAMERA ID | IMAGE ID | SHOOTING DATE AND TIME | OBJECT | STATE | SCANNING WIDTH (HORIZONTAL) | SCANNING WIDTH (VERTICAL) | DETECTABILITY | COORDINATES (HORIZONTAL, VERTICAL) |
|---|---|---|---|---|---|---|---|---|
| 0001 | 00000001 | 2001/01/01 12:00:00.000 | AUTOMOBILE | OVERALL, DIRECTED TO LEFT | 200 | 100 | × | (0,0) |
| 0001 | 00000001 | 2001/01/01 12:00:00.000 | AUTOMOBILE | OVERALL, DIRECTED TO LEFT | 200 | 100 | × | (200,0) |
| 0001 | 00000001 | 2001/01/01 12:00:00.000 | AUTOMOBILE | OVERALL, DIRECTED TO LEFT | 200 | 100 | × | (400,0) |
| 0001 | 00000001 | 2001/01/01 12:00:00.000 | AUTOMOBILE | OVERALL, DIRECTED TO LEFT | 200 | 100 | ... | ... |
| 0001 | 00000001 | 2001/01/01 12:00:00.000 | AUTOMOBILE | OVERALL, DIRECTED TO LEFT | 100 | 100 | × | (0,0) |
| 0001 | 00000001 | 2001/01/01 12:00:00.000 | AUTOMOBILE | OVERALL, DIRECTED TO LEFT | 100 | 100 | ... | (100,0) |
| 0001 | 00000001 | 2001/01/01 12:00:00.000 | AUTOMOBILE | OVERALL, DIRECTED TO LEFT | 100 | 100 | ... | ... |
| 0001 | 00000001 | 2001/01/01 12:00:00.000 | AUTOMOBILE | OVERALL, DIRECTED TO LEFT | 50 | 100 | × | (0,0) |
| 0001 | 00000001 | 2001/01/01 12:00:00.000 | AUTOMOBILE | OVERALL, DIRECTED TO LEFT | 50 | 100 | ... | (50,0) |
| 0001 | 00000001 | 2001/01/01 12:00:00.000 | AUTOMOBILE | OVERALL, DIRECTED TO LEFT | 50 | 100 | ... | ... |
| 0001 | 00000001 | 2001/01/01 12:00:00.000 | AUTOMOBILE | OVERALL, DIRECTED TO LEFT | 200 | 50 | × | (0,0) |
| 0001 | 00000001 | 2001/01/01 12:00:00.000 | AUTOMOBILE | OVERALL, DIRECTED TO LEFT | 200 | 50 | × | (200,0) |
| 0001 | 00000001 | 2001/01/01 12:00:00.000 | AUTOMOBILE | OVERALL, DIRECTED TO LEFT | 200 | 50 | ... | ... |
| 0001 | 00000001 | 2001/01/01 12:00:00.000 | ... | ... | ... | ... | ... | ... |
| 0001 | 00000001 | 2001/01/01 12:00:00.000 | PEDESTRIAN | OVERALL, DIRECTED TO LEFT | 80 | 40 | × | (0,0) |
| 0001 | 00000001 | 2001/01/01 12:00:00.000 | PEDESTRIAN | OVERALL, DIRECTED TO LEFT | 80 | 40 | × | (80,0) |
| 0001 | 00000001 | 2001/01/01 12:00:00.000 | PEDESTRIAN | OVERALL, DIRECTED TO LEFT | 80 | 40 | × | (160,0) |
| ... | ... | ... | ... | ... | ... | ... | ... | ... |

FIG. 16

OBJECT CANDIDATE AREA INFORMATION

| CAMERA ID | OBJECT | STATE | ABSOLUTE / RELATIVE | DEPENDENT OBJECT AND/OR STATE | CANDIDATE AREA FORMULA | DOMAIN OF DEFINITION | TIME | SCANNING WIDTH (HORIZONTAL) | SCANNING WIDTH (VERTICAL) |
|---|---|---|---|---|---|---|---|---|---|
| 0001 | AUTOMO-BILE | OVERALL, DIRECTED TO RIGHT | ABSOLUTE | × | h = 600 | 0 <= w <= 1600 | 06:00:00 ~ 17:00:00 | 200 | 90 |
| 0001 | AUTOMO-BILE | OVERALL, DIRECTED TO LEFT | ABSOLUTE | × | h = 600 | 0 <= w <= 100, 300 <= w <= 1600 | 06:00:00 ~ 17:00:00 | 200 | 90 |
| 0001 | AUTOMO-BILE | : | : | : | : | : | : | : | : |
| 0001 | AUTOMO-BILE | RIGHT-HALF, DIRECTED TO RIGHT | RELATIVE | OVERALL OF A TRUCK DIRECTED TO LEFT | h = 300 | 150 <= w <= 232 | 06:00:00 ~ 17:00:00 | 100 | 50 |
| 0001 | AUTOMO-BILE | : | : | : | : | : | : | : | : |
| 0001 | AUTOMO-BILE | OVERALL, DIRECTED TO RIGHT, NIGHT TIME | ABSOLUTE | × | h = 600 | 0 <= w <= 1600 | 00:00:00 ~ 05:59:59, 17:00:00 ~ 23:59:59 | 200 | 90 |
| 0001 | AUTOMO-BILE | : | : | : | : | : | : | : | : |
| 0001 | AUTOMO-BILE | OVERALL, DIRECTED TO FRONT | ABSOLUTE | × | h = 16w - 9600 | 600 <= w <= 700 | 06:00:00 ~ 17:00:00 | 50 | 100 |
| 0001 | AUTOMO-BILE | : | : | : | : | : | : | : | : |
| 0001 | PEDEST-RIAN | OVERALL, DIRECTED TO RIGHT | ABSOLUTE | × | h = 320 | 0 <= w <= 1600 | 06:00:00 ~ 17:00:00 | 40 | 80 |
| : | : | : | : | : | : | : | : | : | : |

OBJECT DETECTION APPARATUS, TRAFFIC MONITORING SYSTEM, METHOD OF CONTROLLING AN OBJECT DETECTION APPARATUS AND PROGRAM

CROSS-REFERENCE TO RELATED APPLICATIONS

This application is a National Stage Entry of PCT/JP2018/011,273 filed on Mar. 22, 2018, which claims priority from Japanese Patent Application 2017-058,003 filed on Mar. 23, 2017, the contents of all of which are incorporated herein by reference, in their entirety.

The present invention is related to an object detection apparatus, a traffic monitoring system, a method of controlling an object detection apparatus and a program.

TECHNICAL FIELD

Background

In various industrial fields, there are many requests about detecting locations of specific objects from image data. As one of those requests, there is object detection from a movie taken at a fixed-point by a device such as a monitoring camera (for example, a movie such as shown in FIG. 18).

When detecting any object from an image data, it is necessary to generate and prepare in advance a discriminator (also called "classifier" or "detector") for each object desired to be detected and apply the discriminator to the image data. While various methods exist as method of generating discriminators, usually, attention is paid to colors and/or shapes of an object, a feature quantity is designed to make this object distinguishable, a comparison is performed to an unknown image with the feature quantity to determine whether the object is reflected or not, in many cases.

In addition, as described above, it is necessary to generate a discriminator for each object. At that time, when it is necessary to accurately detect this object even if the object is in a special state, it is necessary to generate a discriminator for each special state of the object. For example, when a pedestrian is set as an object desired to be detected, various variations may be envisaged as special states, such as: directed to front in the image, turning back in the image, being directed to right or left, and the like. Thus, special states include "a state in which the object looks different". Alternatively, when an automobile is set as an object desired to be detected, a state so that the automobile is hidden behind a truck in front of the image and only a right-half thereof is shown corresponds to the above described special states. Thus, special states include "a state in which a part of the object is reflected".

A discriminator for each object and/or state which is generated as above is applied to a detection target image (when the target is a movie, an image cut out from an image group of each frame) by a sliding window method. The sliding window method is a method of shifting a small frame (scanning frame 31) from an edge to another edge of an image, little by little, and applying a discriminator to each of small frames to perform object detection, as shown in FIG. 19.

Here, a non-negligible time of processing is necessary to carry out an image-scanning by the sliding window method to an entire image and the concerning processing time may be a bottleneck when a real-time detection is required for example.

However, when applying the sliding window to image data or movie data taken by a monitoring camera or the like, the processing time can be shorten by manually setting a candidate area of each object and limiting a range to apply a discriminator.

For example, in a case of monitoring a road traffic situation as shown in FIG. 18, since it is easy to determine that an area in which an automobile may appear in an image is on a road, an area on the road can be set as a candidate area. In addition, if discriminators to be used are separated such as a discriminator to detect an automobile directed to right and a discriminator to detect an automobile directed to left, since it is easy to determine in which side of the road in respect to the extending direction thereof an automobile may appear, the concerning area can be set as a candidate area. For example, by referring FIG. 20, an area 32 can be set as a candidate area corresponding to a discriminator to detect an automobile directed to right and an area 33 as a candidate area corresponding to a discriminator to detect an automobile directed to left.

As described above, by setting candidate areas, a processing time can be shorten because a scanning range of sliding window when detecting is limited to a set area, instead of the entire image.

The patent literature 1 discloses a technology of generating information about which object appears in each scene in which area with how much probability, by aggregating numbers of images and locations of the detection target object appearing in a plurality of images taken in past in each scene. By use of the concerned information, an improvement of accuracy can be expected when scanning an image by the sliding window method and applying a discriminator, and scanning range can be limited by excluding areas with low probability from scanning target of sliding window in the first place.

The patent literature 2 discloses a technology to improve accuracy in detection of pedestrian by inputting images from a vehicle-mounted camera, determining current scenes around an automobile and determining pedestrian detection candidate area in each scene.

[Patent Literature 1]
WO 2012/046,426 A1
[Patent Literature 2]
Japanese Patent Kokai Publication No. JP2007-329,762A

SUMMARY

It should be noted that each disclosure of the above cited technical references is incorporated by reference in the present document. The following analysis has been performed by inventors of the present invention.

As described above, when applying discriminators for each object to a group of image taken at a fixed-point by a device such as a monitoring camera, candidate areas may be manually set in order to limit scanning area of the sliding window.

However, there are problems in such method.

Firstly, efforts and times are required to specify candidate areas in the above described method. If there are few variations of objects and/or states desired to be detected and if shooting point(s) is/are single or few, then it would be possible to manually set every discriminator candidate areas. However, if numbers of objects as detection targets, their states and shooting points increase, then their combinations number becomes enormous and there is a limit in manual supports.

Secondly, in according with the above described method, defects may occur in specification of candidate areas. When a person in charge or the like manually specifies candidate areas, the specification of the candidate area may be ambiguous and a candidate area which is not optimal may be specified. In particular, if an area in which no object actually appears is specified, it may be a cause of wasting processing time while applying a slide window. On the other hand, if an object appears in an area different from specified candidate areas (if an unexpected object appears), the concerned object cannot be detected (a missing of detection occurs). In addition, it is difficult to manually and flexibly specify a candidate area for an object which depends on other moving object and which may relatively appear in a state of being adjacent to or hidden behind the concerned moving object.

Thirdly, the above described method cannot appropriately respond to situation change of shooting place with a passage of time. After having manually specified a candidate area and started an operation, the candidate area may change with a passage of time.

For example, by referring FIGS. 21A and 21B, the candidate area changes (a part thereof becomes unnecessary) in accordance with existence or inexistence of a signboard 34. In FIG. 21A, a part of an automobile directed to left is hidden in a place where the signboard 34 exists and an upper-half of the automobile 35 is detected. Therefore, a candidate area corresponding to a discriminator for "upper-half of an automobile directed to left" is specified in an area upper to the signboard 34.

However, after having started an operation of a system in a state of FIG. 21A, the signboard 34 may be removed some months later, for example. As a result, as shown in FIG. 21B, a previously specified candidate area (upper-half of an automobile directed to left) will be remained. Since the signboard 34 does not exist, an upper-half part of an automobile directed to left will not be detected in the concerned area. However, as long as the concerned remained area is an area to apply the sliding window, it causes wasting of processing time.

As another example showing a change of candidate area with a passage of time, there is an occurrence of construction works (refer to FIGS. 22A and 22B). In FIG. 22A, an area 36 is specified as a candidate area of an automobile directed to left. In the situation shown in FIG. 22A, for example, a construction will occur in a part of a road several months later and it will become a situation in which automobiles, which travel in left direction with respect to the drawing on the lane of the front-side, travel on a part of the opposite lane (refer FIG. 22B). In this case, the part in construction works in the candidate area is a waste area. In addition, the area for travelling opposite lane needs to be re-specified as a new candidate area.

While various methods of calculating candidate areas for detecting objects exist to shorten processing time and improving detection accuracy in object detection, none of those methods solves the above described problem. For example, it is impossible to flexibly specify a relative object with the technology disclosed in Patent Literature 1. In addition, in Patent Literature 1, changes of discriminating area with a passage of time are not considered. In addition, the technology disclosed in Patent Literature 2 needs to manually decide a method of scene distinction and the distinction method to be decided at that time is also based on heuristics: therefore, erroneous detections may occur.

The present invention mainly aims to provide an object detection apparatus, a traffic monitoring system, a method of controlling the object detection apparatus and a program, which contribute to generate preferred ranges when applying a discriminator to an image.

In a first aspect of the present invention and/or disclosure, an object detection apparatus is provided, the object detection apparatus comprising a discriminator applier, which applies a discriminator detecting an object to images acquired in past and calculates object detection information including at least location information of the object detected by the discriminator, in a learning phase, and a candidate area calculator, which performs a machine-learning by use of the object detection information and calculates object candidate area information including at least information for specifying a candidate area in which the object may appear in an image.

In a second aspect of the present invention and/or disclosure, a traffic monitoring system is provided, the traffic monitoring system including a monitoring camera and an object detection apparatus which detects an object from an image data acquired by the monitoring camera, wherein the object detection apparatus comprises a discriminator applier, which applies a discriminator detecting an object to images acquired in past and calculates object detection information including at least location information of the object detected by the discriminator, in a learning phase, and a candidate area calculator, which performs a machine-learning by use of the object detection information and calculates object candidate area information including at least information for specifying a candidate area in which the object may appear in an image.

In a third aspect of the present invention and/or disclosure, a method of controlling an object detection apparatus is provided, the method of controlling an object detection apparatus comprising applying a discriminator, which detects an object to images acquired in past, and calculating object detection information, which includes at least location information of the object detected by the discriminator, in a learning phase, and performing a machine-learning, by use of the object detection information, and calculating object candidate area information, which includes at least information specifying a candidate area in which the object may appear in an image.

In a fourth aspect of the present invention and/or disclosure, a program is provided, the program making a computer to execute a process of applying a discriminator, which detects an object to images acquired in past, and calculating object detection information, which includes at least location information of the object detected by the discriminator, in a learning phase, and a process of performing a machine-learning, by use of the object detection information, and calculating object candidate area information, which includes at least information specifying a candidate area in which the object may appear in an image.

It should be noted that this program may be recorded in a computer-readable storage medium. This storage medium may be non-transient, such as a semiconductor memory, a hard disk, a magnetic storage medium, an optical storage medium. The present invention may be realized as a computer program product.

In each aspect of the present invention and/or disclosure, an object detection apparatus, a traffic monitoring system, a method of controlling an object detection apparatus and a program, which contribute to generate a preferred area when applying a discriminator to an image, are provided.

BRIEF DESCRIPTION OF THE DRAWINGS

FIG. 6 is a flowchart showing an example of an operation of an object detection apparatus in a learning phase.

FIG. 7 is a diagram showing an example of object detection information.

FIG. 8 is a diagram showing an example of object candidate area information.

FIG. 14 is a diagram showing an example of a discriminator parameter setting information related to the second example embodiment.

FIG. 15 is a diagram showing an example of object detection information related to the second example embodiment.

FIG. 16 is a diagram showing an example of object candidate area information related to the second example embodiment.

PREFERRED MODES

Firstly, an outline of an example embodiment will be described. It should be noted that drawing referring symbols, which are added to in this outline, are added to each elements for convenience as an example to help understanding, and the description of this outline does not intend any limitation. In addition, connection lines between blocks in each drawing include both bidirectional ones and unidirectional ones. One-way arrows schematically show flows of main signals (data) while their bi-directionality is not excluded. Further, in circuit diagrams, block diagrams, internal configuration diagrams, connection diagrams and the like shown in the disclosure of the present application, input ports and output ports exist at each of input ends and output ends of each connection line, although their explicit illustrations are omitted. It is similar for input/output interfaces too.

Figure 1:
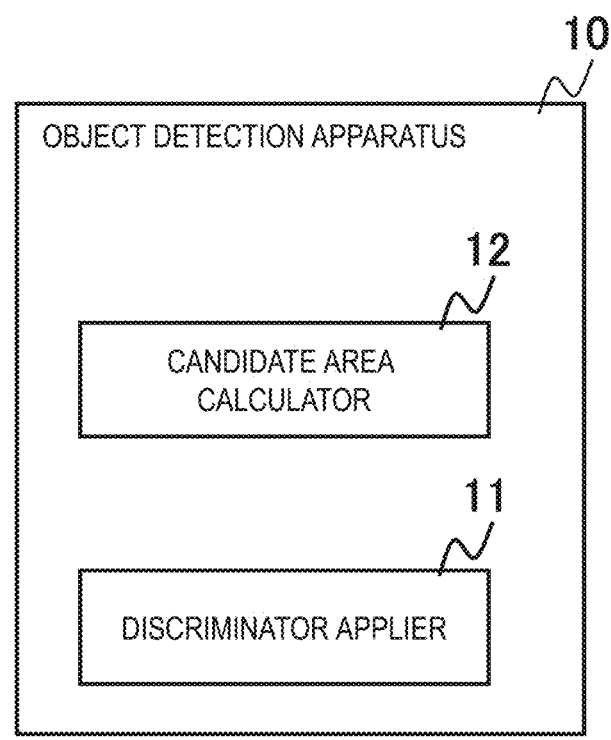
FIG. 1 is a diagram to explain an outline of an example embodiment.

An object detection apparatus 10 related to an example embodiment is provided with a discriminator applicator 11 and a candidate area calculator 12 (refer to FIG. 1). The discriminator applier 11 applies a discriminator which detects an object to images acquired in past, in a learning phase, and calculates object detection information including at least location information of the object detected by the discriminator. The candidate area calculator 12 performs a machine-learning by use of the object detection information and calculates object candidate area information including at least information specifying a candidate area in which the object may appear in an image.

The object detection apparatus 10 automatically calculates object candidate area information, which specifies information such as "which discriminator should be applied to which area", when applying a discriminator to detect an object from a fixed point image group acquired by a monitoring camera or the like, by performing the machine-learning related to the object detection information calculated from the above described image group. The object detection apparatus 10 detects an object (and its state) as a detection target from an enormous image data acquired in a place where an operation is to be performed and calculates an area in which an object may actually appear (candidate area) among locations in which concerning objects have been detected (locations in images). Thus, waste areas or the like in which no object actually appears will not be calculated as a candidate area any more, and an optimal candidate area (area in which a sliding window is to be applied) will be calculated. In addition, the calculation of the concerned candidate area is automatically performed by a machine-learning by the object detection apparatus 10 and thus does not need any manual operation. In addition, by regularly executing the above described machine-learning by the object detection apparatus 10 (the calculation of object candidate area information), even in a case in which an environment including monitoring target has changed, a candidate area suitable to the concerned change of environment can be calculated.

In the following, specific example embodiments will be described in more detail, by referring to drawings. It should be noted that in each example embodiment a same component is added with a same symbol and its description is omitted.

First Example Embodiment

A first example embodiment will be described in detail by referring to drawings.

Figure 2:
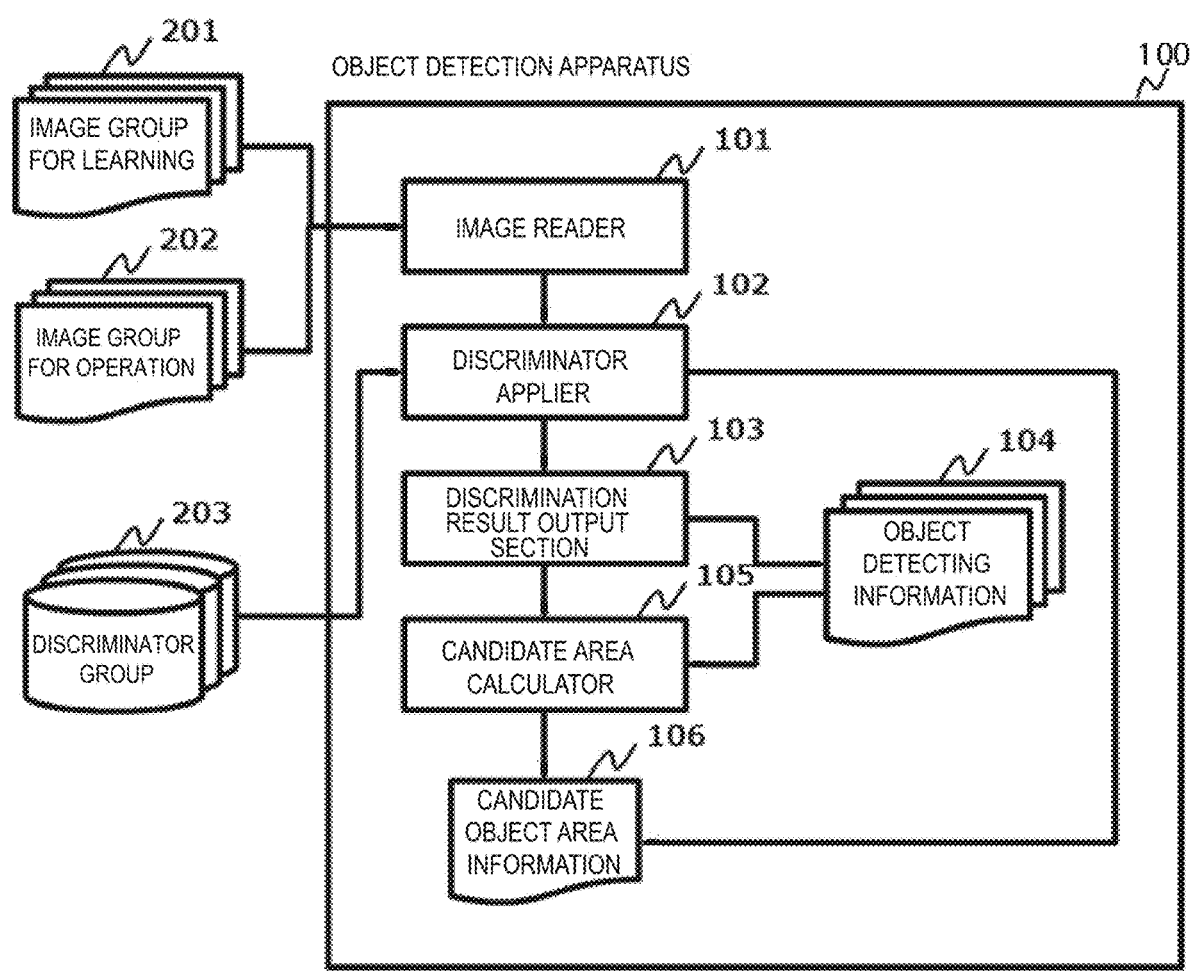
FIG. 2 is a diagram showing an example of an internal configuration of an object detection apparatus related to a first example embodiment.

FIG. 2 is a diagram showing an example of an internal configuration of an object detection apparatus 100 related to the first example embodiment. Operations of the object detection apparatus 100 consist in two phases: a learning phase and an operation phase.

The learning phase is a phase in which each discriminator included in a discriminator group 203 is applied to image group 201 acquired by fixed point monitoring in past and object detection information 104 of each image is collected. In addition, in the learning phase, object candidate area information 106 of each object (each state of objects) is calculated from detection information from each discriminator, by use of known machine-learning technology. Details of the object detection information 104 and the object candidate area information 106 will be described below.

The operation phase is a phase in which object detection is performed from the image group 202 acquired by the monitoring camera or the like, by limiting scanning area of sliding window on a basis of the object candidate area information 106 calculated in the learning phase. It should be noted that even during the operation phase (during operation of the system), an image group for learning is newly added, learning with respect to the concerned added image group is performed, and the object candidate area information 106 including candidate areas is recalculated and updated.

The object detection apparatus 100 shown in FIG. 2 is provided with an image reader 101, a discriminator applier 102, a discrimination result output section 103 and a candidate area calculator 105. In addition, the object detection apparatus 100 has a storage medium which stores the object detection information 104 and the object candidate area information 106.

The image reader 101 is a means for reading the above described image group (image group for learning 201, image group for operation 202). More specifically, the image reader 101 reads the image group 201 in the learning phase and reads the image group 202 in the operation phase.

The discriminator applier 102 is a means for reading discriminators from a discriminator group 203, scanning an image by the sliding window method with respect to the image acquired by the image reader 101 to apply a discriminator (use a discriminator). The operation of the discriminator applier 102 is different depending on phases. More specifically, the discriminator applier 102 scans an entire image and calculates the object detection information 104 including location information of the object detected by the discriminator, in the learning phase. In addition, the discriminator applier 102 scans just the area limited by the object candidate area information 106, in the operation phase. That is, the discriminator applier 102 applies a discriminator to an acquired image with a limitation of area determined by the candidate area among areas of the image acquired in the operation phase.

The discrimination result output section 103 is a means for formatting a result of applying by the discriminator applier 102 to output as the object detection information 104.

The candidate area calculator 105 is a means for performing the machine-learning by use of the object detection information 104 and calculating the object candidate area information 106 which includes at least information specifying a candidate area in which an object may appear in an image. More specifically, the candidate area calculator 105 calculates, for each object (for each state of object), an area in which the concerning object may appear among areas of the target image, by a machine-learning technology using the object detection information 104, and outputs the calculation result as the object candidate area information 106.

Hardware Configuration

Next, the hardware of the object detection apparatus 100 will be described.

Figure 3:
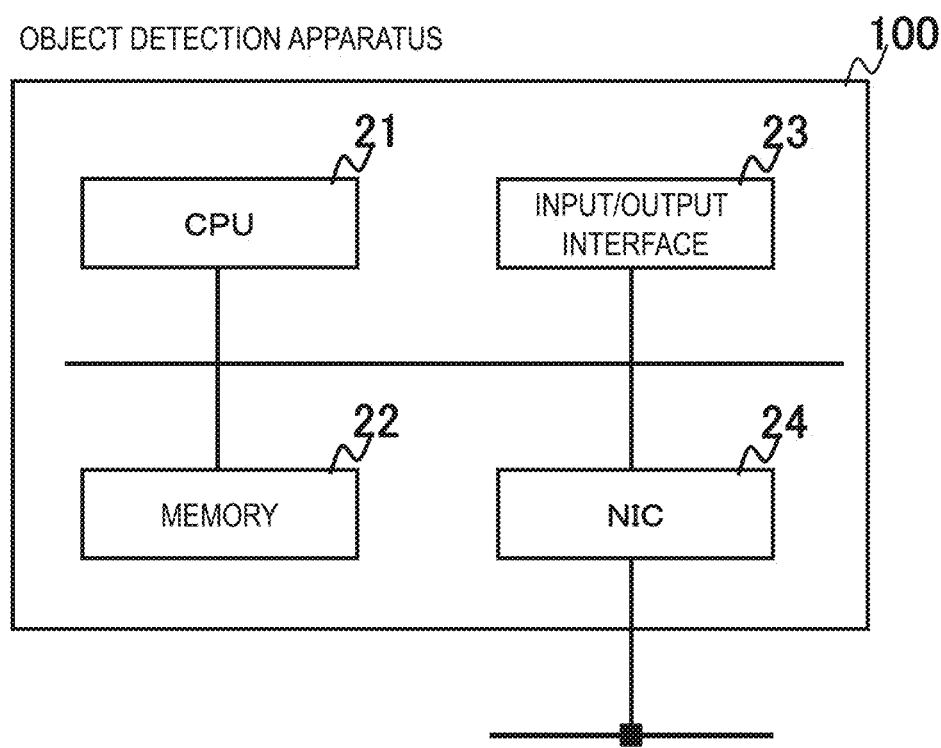
FIG. 3 is a block diagram showing an example of a hardware configuration of an object detection apparatus related to the first example embodiment.

FIG. 3 is a block diagram showing an example of a hardware configuration of an object detection apparatus 100 related to the first example embodiment.

The object detection apparatus 100 is a so called information processing device (computer) and is provided with a configuration shown in FIG. 3 as an example. For example, the object detection apparatus 100 is provided with a Central Processing Unit (CPU) 21, a memory 22, an input/output interface 23 and Network Interface Card (NIC) 24 as a communication means, and the like, which are mutually connected via an internal bus.

It should be noted that the configuration shown in FIG. 3 is not intended to limit hardware configuration of the object detection apparatus 100. The object detection apparatus 100 may include any hardware which is not illustrated. Alternatively, the number of CPU and the like included in the object detection apparatus 100 is not intended to be limited by the example shown in FIG. 3: for example, a plurality of CPUs may be included in the object detection apparatus 100.

The memory 22 includes one or more among a Random Access Memory (RAM), a Read Only Memory (ROM) and an auxiliary storage device (a hard disk or the like). The input/output interface 23 is a means for working as an interface of a display device, an input device or the like which are note illustrated. The display device is, for example, a crystal liquid display or the like. The input device is, for example, a device which accepts user operations, such as a keyboard, a mouse or the like. The NIC 24 is, for example, an interface which is connected to the monitoring camera proving the image group 202 and receives data from the concerned camera.

Functions of the object detection apparatus 100 are realized by above described processing modules (for example, the candidate area calculator 105 or the like). For example, the functions are realized by an execution of a program stored in a memory by a CPU. In addition, this program can be downloaded via a network or updated by use of a storage medium in which the program is stored. Further, the above described processing modules may be realized by a semiconductor chip. That is, the functions performed by the above described modules may be realized by any hardware and/or software.

Description of Operations

Next, by referring to drawings, operations of the object detection apparatus 100 related to the first example embodiment will be described.

Figure 18:
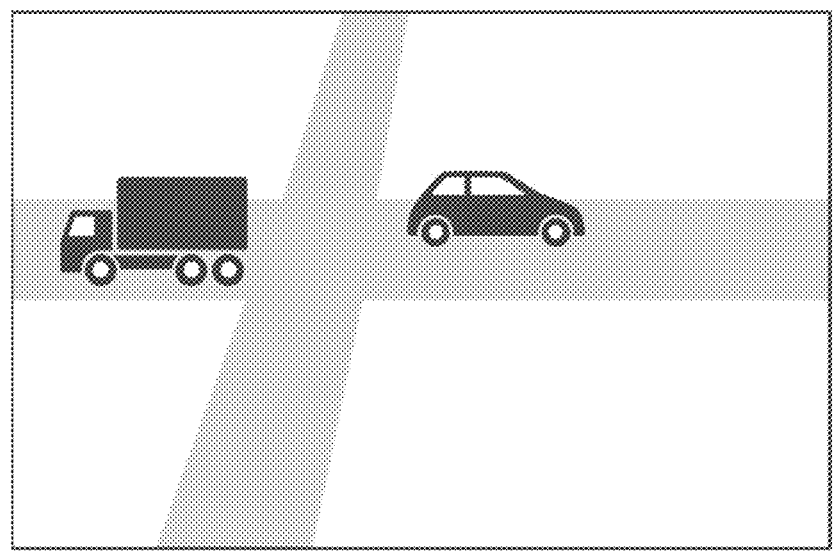
FIG. 18 is a diagram showing an example of a movie (video) taken at a fixed point.
Figure 19:
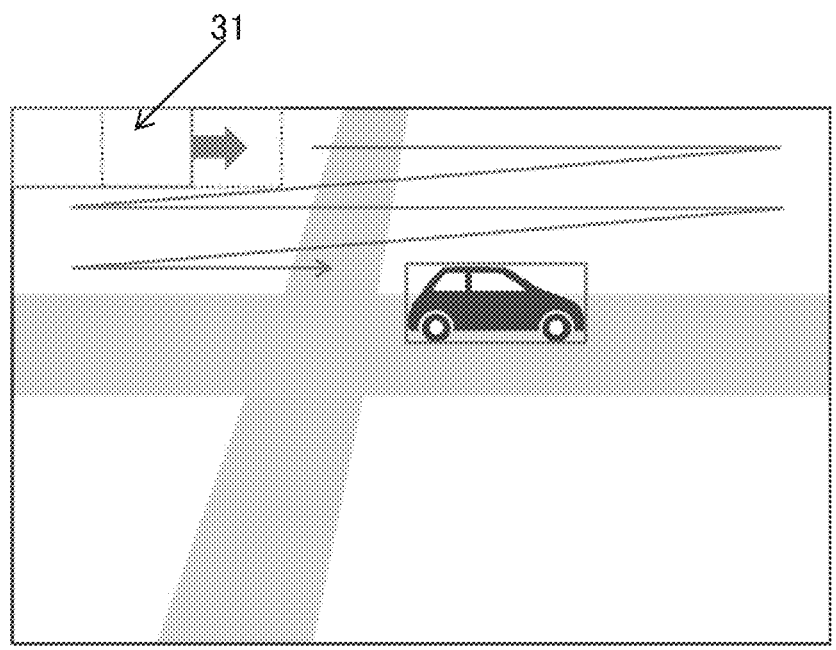
FIG. 19 is a diagram to explain a sliding window method.
Figure 20:
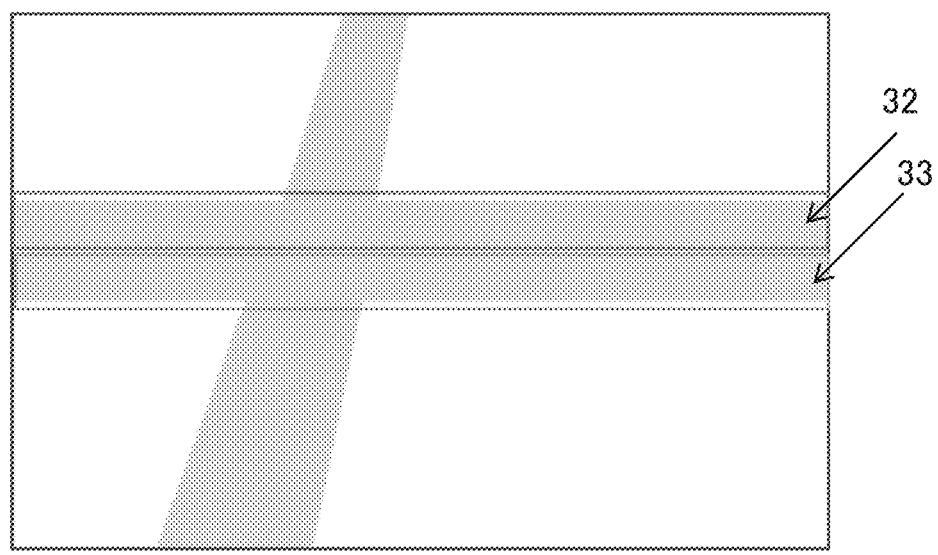
FIG. 20 is a diagram to explain a sliding window method.
Figure 21B:
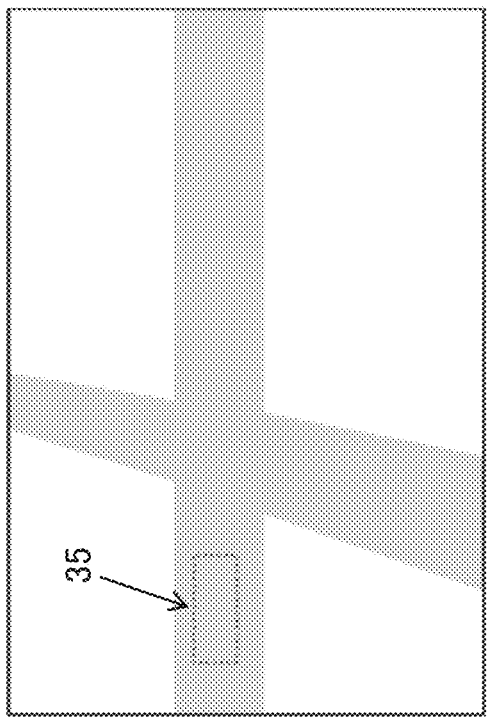
FIGS. 21A and 21B are diagrams to explain a change of a candidate area with a passage of time.
Figure 21A:
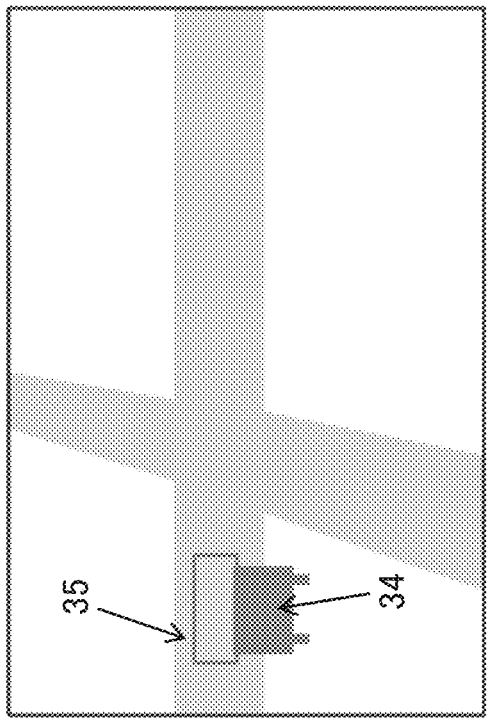
Figure 22A:
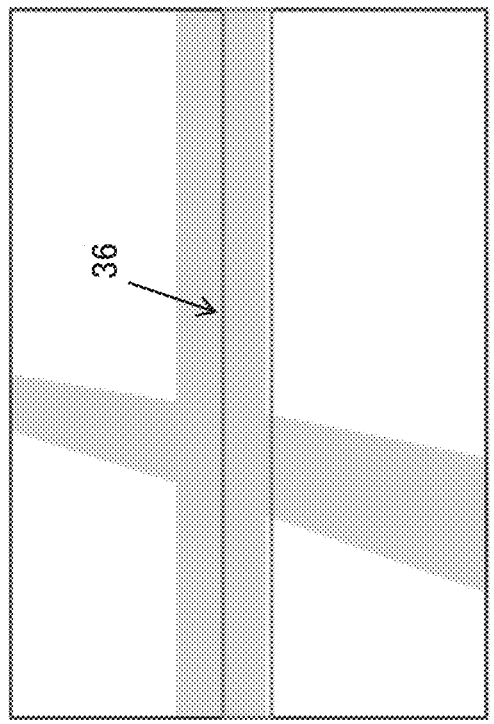
FIGS. 22A and 22B are diagrams to explain a change of a candidate area with a passage of time.
Figure 22B:
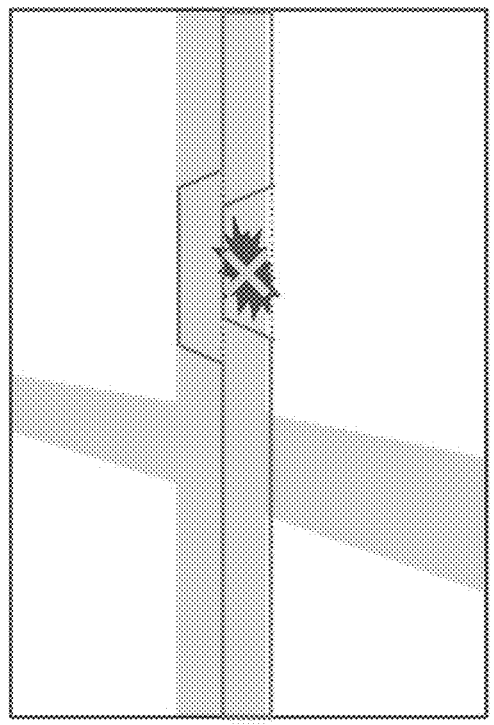

Here, operations of acquiring a movie (with a field size supposed to be 1600 by 900) of situation of an intersection as shown in FIG. 18 by a fixed point monitoring camera and detecting a specific object. In addition, target objects to be detected are automobiles, trucks and pedestrians.

As described above, in the first example embodiment, it is necessary to generate object candidate area information 106 by learning past movie as a learning phase, before operation phase which is a phase to actually perform object detection. In addition, as a premise of disclosure in the present application, discriminator group 203 for detecting objects is supposed to be prepared in advance. Each discriminator of the discriminator group 203 is supposed to be a device outputting information of location (coordinates) where the target object exists from an image. Each discriminator which configures the discriminator group 203 is prepares for each object and each predetermined state of the object.

Figure 4:
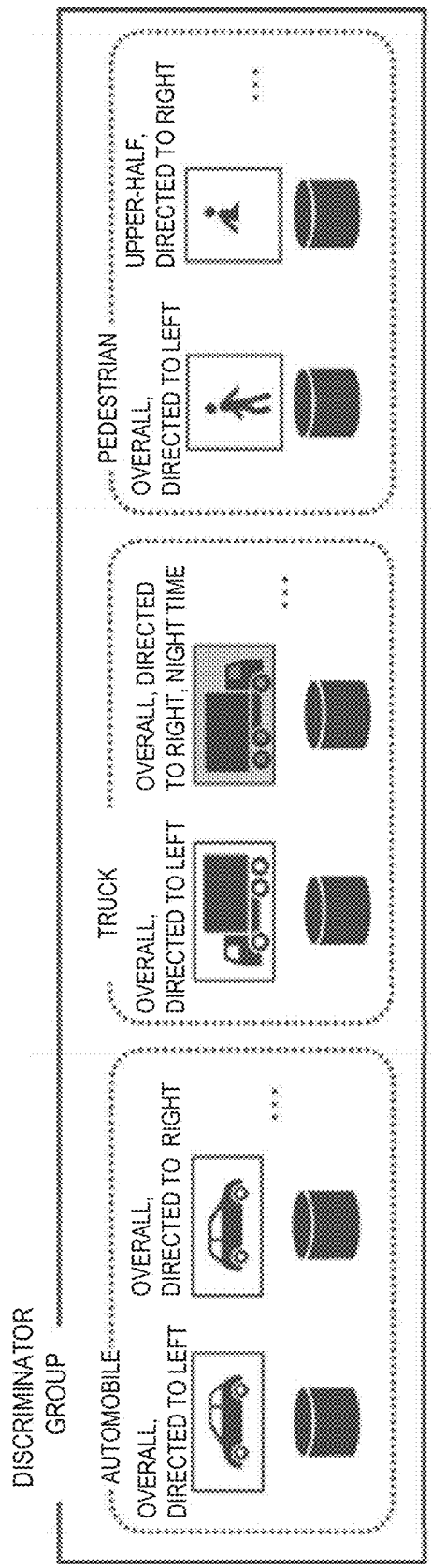
FIG. 4 is a diagram to explain a discriminator group used in the first example embodiment.

Object discrimination by each discriminator may use any algorithm. For example, linear discrimination, Support Vector Machine (SVM), deep learning and the like are examples of the above described algorithm. In addition, a discriminator is prepared for each object and each state of object. For example, by referring to FIG. 4, a discriminator is prepared for each object (human, automobile, truck) and for each state thereof (directed to left, directed to right, overall, partial, daytime and night time). It should be noted that in FIG. 4, in relation with discriminators for trucks, a left-side one is shown as an example of discriminator for detecting a truck in daytime, and a right-side one is shown as an example of discriminator for detecting a truck in night time.

Figure 5:
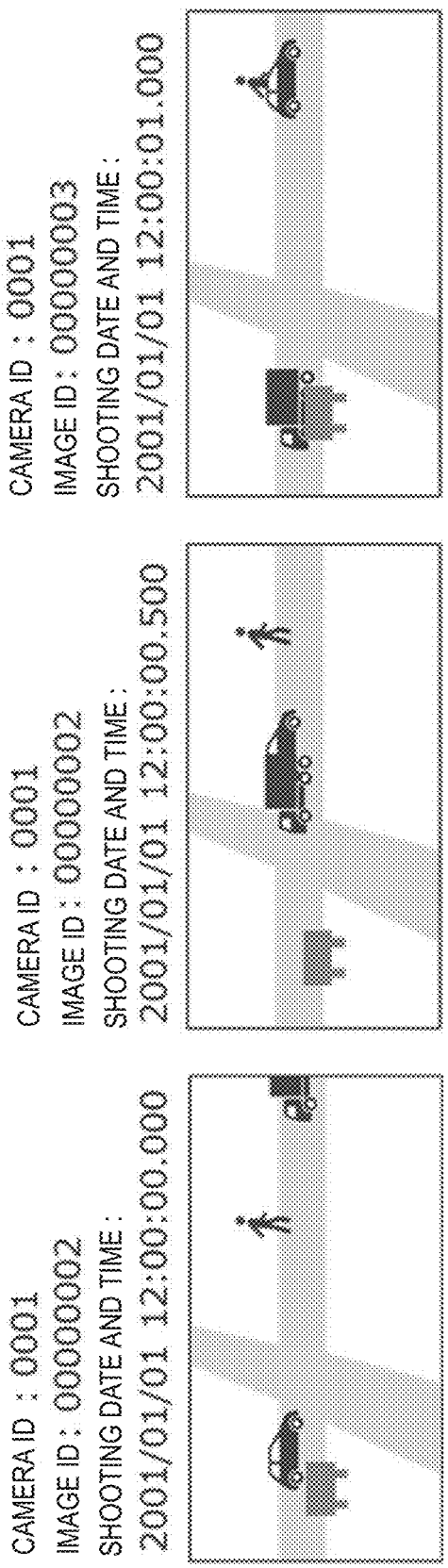
FIG. 5 is a diagram showing an example of an image acquired by a monitoring camera.

In the first example embodiment, it is necessary to prepare an image group for learning 201 in advance, in addition to preparation of discriminators in advance. The image group for learning 201 may be generated, for example, by dividing a past movie (video), acquired by a monitoring camera or the like in a place where the system is planned to start operating, into frame unit images. It should be noted that appropriate number of frames may be thinned instead of keeping every frames in the division at that time. Further, each image generated by division is added with a monitoring camera IDentifier (ID), image ID, shooting date and time and the like (refer to FIG. 5).

Learning Phase

At first, an operation of the object detection apparatus 100 in a learning phase will be described.

FIG. 6 is a flowchart showing an example of an operation of the object detection apparatus in a learning phase. In a learning phase, at first, object detection information 104 is generated, according to the flowchart in FIG. 6.

In step S01, the image reader 101 reads one image and sets this image as a target of processing.

In step S02, the discriminator applier 102 selects one object, to which no discriminator is applied yet in relation with the target image, as a target of processing.

In step S03, the discriminator applier 102 selects one discriminator, which is in an unapplied state, among target objects, in relation with the target image.

In step S04, the discriminator applier 102 scans the image by sliding window method and applies (uses) the selected discriminator. That is, the discriminator applier 102 inputs image data cropped by use of a small scanning frame to the discriminator and obtains a judgement result (detectability of the object, location information at a time of detecting the object) from the discriminator.

In step S05, the discrimination result output section 103 outputs the detectability of the target object of each scanning frame and location information of the scanning frame (for example, coordinates in top left corner of the scanning frame) in a table format.

In step S06, the discriminator applier 102 judges whether discriminators of every states of target objects are applied to the target image or not.

If the discriminators of every states are not applied (branch "No" in the step S06), the process returns to step S03 and continues. If the discriminator of every states are applied (branch "Yes" in the step S06), the discriminator applier 102 judges whether every discriminators of detection target object are applied or not (step S07).

If every discriminators of detection target object are not applied (branch "No" in the step S07), the process returns to step S02 and continues. If every discriminator of detection target object is applied (branch "Yes" in the step S07), the discriminator applier 102 judges whether every images are processed or not (step S08).

If not all images are processed (branch "No" in the step S08), processes of steps S01 and following are repeated. If all images are processed (branch "Yes" in the step S08), the process related to calculation of object detection information 104 ends.

Thus, the object detection apparatus 100 reads images of image group for learning 201 one by one in turn, applies in turn every discriminators which are prepared to each image and outputs object detection information (detectability of each scanning frame, coordinates in top left corner of frames) in a table format one by one.

FIG. 7 is a diagram showing an example of object detection information 104. For example, by referring to FIG. 7, in an image of image ID "00000001", it is understood that an automobile directed to right and reflected by overall is detected in a location of coordinates (300, 400), a truck directed to left and reflected by left-half portion only is detected in a location of coordinates (1400, 450) and a pedestrian directed to right and reflected by overall is detected in a location of coordinates (1100, 200).

It should be noted that a detectability of each object and its state may be outputted as a certainty factor value (for example, a value between 0 and 1) such as showing a detection level, instead of a binary value showing detection or non-detection.

When generation of object detection information 104 ends, the candidate area calculator 105 generates object candidate area information 106. An existing machine-learning algorithm is used to calculate a candidate area. Specifically, the candidate area calculator 105 learns a relationship between information of detected location of an object and each attribute (for example, item of each column shown in FIG. 7) and operates so as to predict candidate area formula for object appearance optimal to each object and/or state (such algorithm is used).

As a result of learning the object detection information 104 by the candidate area calculator 105, object candidate area information 106 is calculated in a table format as shown in FIG. 8. The object candidate area information 106 shown in FIG. 8 shows in each row, in which condition and to which area each discriminator should be applied. It should be noted that as a result of machine-learning by the candidate area calculator 105, information related to a discriminator which is set to none of candidate area in an image is not included in the object candidate area information.

The object candidate area information 106 shown in FIG. 8 will be described in the following, while descriptions about the contents in camera ID column, object column and state column are omitted because they are obvious from above explanations.

In the object candidate area information 106 shown in FIG. 8, the "Absolute/Relative" column (field) presents information related to appearance patterns of objects. Specifically, a pattern of appearing in a form depending to other appeared objects is set to "Relative" while a pattern of appearing without depending to any other objects is set to "Absolute".

In the "Dependent Object and/or State" column, depending objects and/or state is described when "Absolute/Relative" column is set to "Relative". It should be noted that fields of "Absolute/Relative" and/or "Depending Object and/or State" can be generated by use of outputs from discriminators detecting objects which depends on other objects and appearance of concerning other object. For example, information in fourth line in FIG. 8 can be generated (learned) from a detection by a discriminator, which detects "an automobile of which a left-half part is hidden behind an overall truck directed to left", of the concerned information. Specifically, when an object has been detected by the concerned discriminator, "Relative" is to be set to "Absolute/Relative" field, "overall of a truck directed to left" is to be set to "Depending Object and/or State" field and the discriminator is to be set as "right-half of an automobile directed to right".

The "Candidate Area Formula" column shows by formula an area of an image in which an object may appear. In the example of FIG. 8, the lower-left corner of the image is set as origin, h shows the vertical axis and w shows horizontal axis. It should be noted that in the example of FIG. 8, an area in which an object may appear is expressed with a linear equation, while it may be expressed by use of inequation(s).

The "Domain of Definition" column shows domains of definition in which above described candidate area formula are valid. By referring columns of "Candidate Area Formula" and "Domain of Definition", a range in which a corresponding object and its state appear (a range in an image) is determined.

The "Time" column shows information related to time (for example, a time zone) in which discrimination application is valid. For example, when discriminators are separated between daytime use (ordinary use) and night time use or the like, there will be a difference in times in which objects may be detected. Since information of shooting date and time is included in the object detection information 104, the candidate area calculator 105 learns the concerned information during a machine-learning and can calculate the "Time" column shown in FIG. 8. It should be noted that in FIG. 8 the "Time" column only describes hour, minute and second, while month and day may be learned and distinguished. If month and day are learned, for example, a change of day length in accordance with seasons can be managed.

By verifying the eighth line in FIG. 8, it can be understood that the target object of the discriminator is an automobile, this object is in a state of overall and directed to front (facing), the candidate area is a range of primary function h=16w-9600 and 600≤w≤700 and the target time is daytime (from 06:00:00 to 17:00:00).

Figure 9:
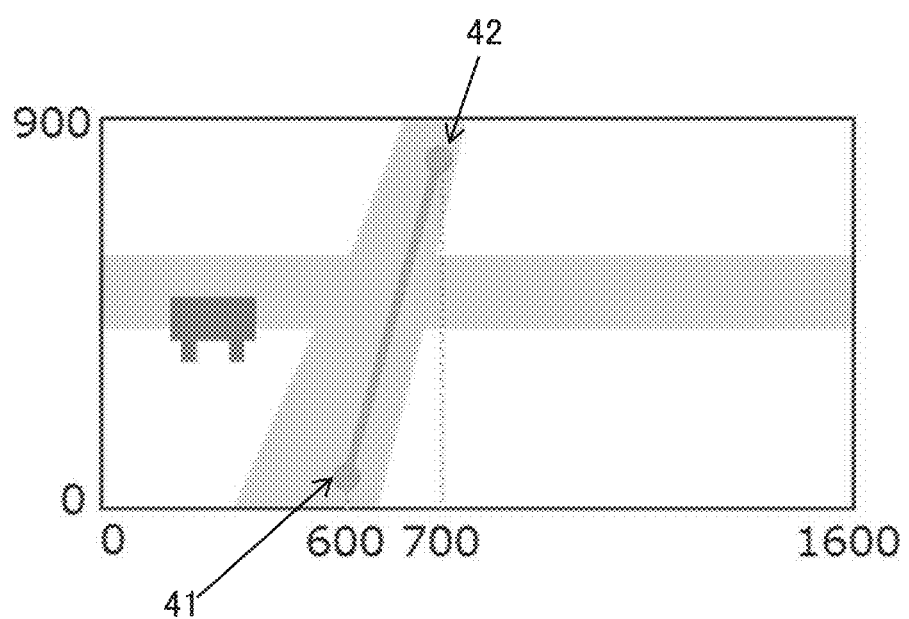
FIG. 9 is a diagram of an image data in which a candidate area described in line 8 of FIG. 8 is reflected.

FIG. 9 is an image in which a candidate area described in the eighth line of FIG. 8 is reflected to an image data. In FIG. 9, the range including a straight line connected between the point 41 and the point 42 is the candidate area in which an automobile directed to front is to be detected in daytime. The discriminator applicator 102 selects, for example, when information in the eighth line of FIG. 8 is read (acquired), an image meeting a condition (daytime) specified to the time field (image acquired in daytime) among images acquired in operation phase. The discriminator applier 102 inputs an image of the range specified by two points in FIG. 9 among areas of the concerned selected image to the discriminator for detecting "overall of an automobile directed to front".

In addition, by verifying the fourth line in FIG. 8, the target object of the discriminator is an automobile and the state of this object is "right-half, directed to right". In addition, "Relative" is set to "Absolute/Relative" column in the fourth line in FIG. 8 and "overall of a truck directed to left" is set to "Depending Object and/or State" column.

Figure 10:
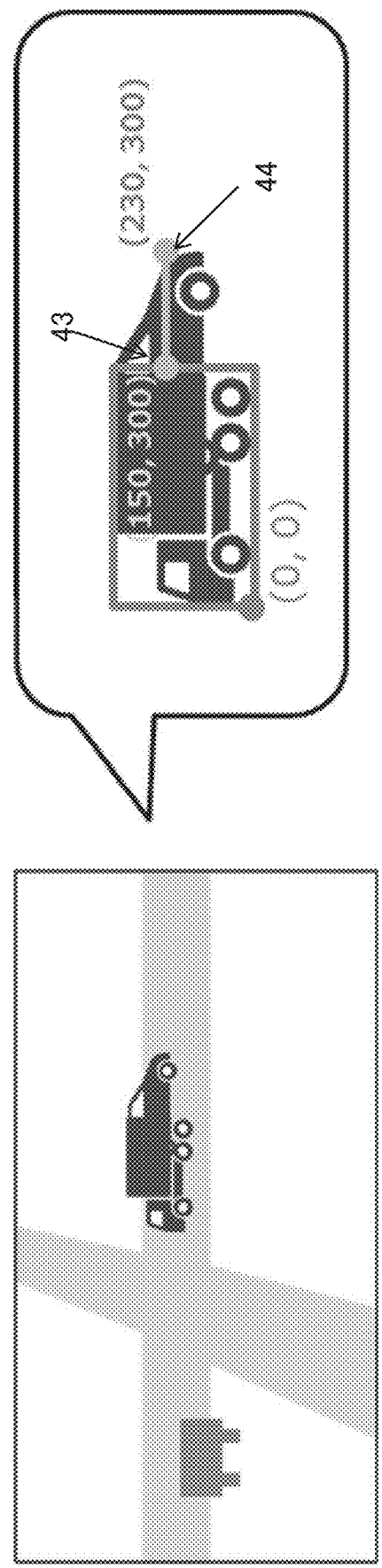
FIG. 10 is a diagram to explain a candidate area described in line 4 of FIG. 8 is reflected.

Those two information ("Absolute/Relative" and "Depending Object and/or State") show that, when an object (state) described in the "Depending Object and/or State" column is detected, a relative candidate area with the lower-left corner of the scanning frame of the detected object as the origin is set and that a candidate area is not fixedly set to the image. FIG. 10 shows the state of the fourth line in FIG. 8 and the area including the straight line connected between the point 43 and the point 44 will be a candidate area of "right-half of an automobile directed to right". The above two information ("Absolute/Relative" and "Depending Object and/or State") are used by the discriminator applier 102 in the operation phase. After a specific object ("overall of a truck directed to left" in the above described example) is detected, the discriminator applier 102 selects a discriminator for detecting other object ("right-half of an automobile directed to right") and applies the concerned selected discriminator to the acquired image.

As described above, the candidate area calculator 105 calculates object candidate area information 106 which associates a condition valid for the discriminator to detect a concerned object (for example, "Time" filed in FIG. 8) and a candidate area (for example, "Candidate Area Formula" field and "Domain of Definition" field in FIG. 8) for each object of detection target (including object state). Further, in response to a detection of an object (for example, a truck directed to left), the candidate area calculator 105 calculates object candidate area information 106 including information (for example, "Absolute/Relative" field and "Depending Object and/or State" field in FIG. 8) for specifying a discriminator for detecting other object (for example, "right-half of an automobile directed to right").

Operation Phase

Next, operations of the object detection apparatus 100 in the operation phase will be described.

Figure 11:
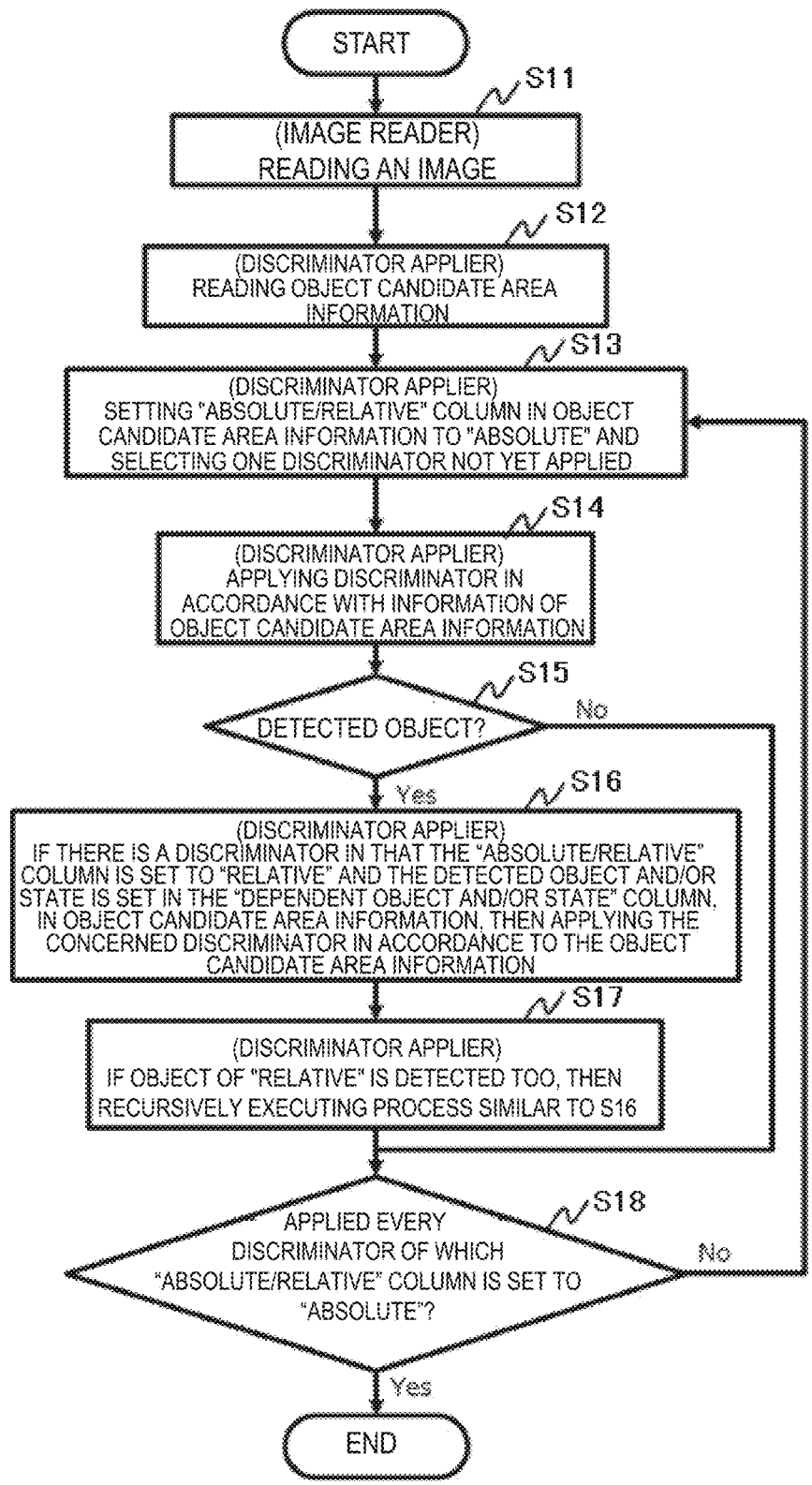
FIG. 11 is a flowchart showing an example of an operation of an object detection apparatus in an operation phase.

FIG. 11 is a flowchart showing an example of an operation of an object detection apparatus 100 in an operation phase.

As described above, the operation phase is a phase in which an object detection is performed in an image (movie) acquired in real time from the monitoring camera. In the operation phase, the object detection is performed by limiting an area of applying the discriminator by use of the object candidate information 106 generated in advance in the learning phase. However, similarly to the learning phase, it is presupposed that the movie which is taken is divided into frame unit images to be processed one by one.

In the step S11, the image reader 101 reads an image.

In the step S12, the discriminator applier 102 reads the object candidate area information 106 stored in the storage medium.

In the step S13, the discriminator applier 102 selects one discriminator (the target is single) of which the "Absolute/Relative" column is set to "Absolute" in the object candidate area information 106 and which is not yet applied.

In the step S14, the discriminator applier 102 applies the discriminator in accordance with information described in the object candidate area information 106.

In the step S15, the discriminator 102 judges whether an object is detected or not.

If no object is detected (branch "No" in the step S15), then the process transits to the step S18. When an object is detected (branch "Yes" in the step S15), in a case in which the "Absolute/Relative" column is set to "Relative" and the discriminator to which the object and/or state detected in the previous step exists in the "Dependent Object and/or State" column, then the discriminator applier 102 applies the concerned discriminator in accordance to the object candidate area information 106. For example, in the above example of the fourth line in FIG. 8, if an object (state of object) of "overall of a truck directed to left" is already detected, the discriminator for detecting "right-half of an automobile directed to right" is applied to the image. At that time, the image to which the concerned discriminator is applied is an image acquired in daytime (from 06:00:00 to 17:00:00) and the candidate area is "h=300, 150≤w≤230".

In addition, the discriminator applier 102 executes a process similar to the step S16 in a case in which an object set as "Relative" is detected (step S17). That is, until any object (and its state) corresponding to the object and/or state set in the "Relative" column is not detected any more, the process in the step S16 will be repeated recursively. For example, in the above described example, if "right-half of an automobile directed to right" is set to the field of "Depending Object and/or State", then a detection of an object and its state corresponding to the concerned "Depending Object and/or State" field will be performed.

In the step S18, the discriminator applier 102 judges whether every discriminator of which "Absolute/Relative" column in the object candidate area information 106 is set to "Absolute" is applied or not. If every discriminator is not applied (branch "No" in the step S18), then the process returns to the step S13 to continue. If every discriminator is applied (branch "Yes" in the step S18), the process related to the image read in the step S11 ends (a next image is read and is similarly processed).

Figure 12:
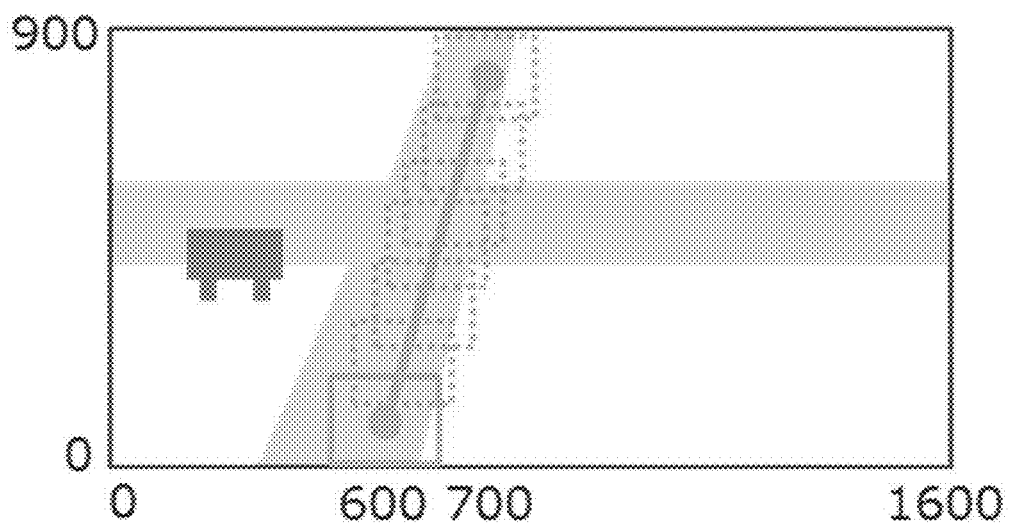
FIG. 12 is a diagram to explain an operation of an object detection apparatus related to the first example embodiment.

Thus, the object detection apparatus 100 processes the lines, in the table of the object candidate area information 106, in which the "Absolute/Relative" column is set to "Relative", in order from the top, and applies the discriminators described therein to the image in accordance with the content of the table (with reference to the content), one by one (step S14). It should be noted that in the applied sliding window method, for example, in a case in which the object is an automobile of a state directed to front, as shown in FIG. 12, a straight line according to the candidate area formula is decomposed with an arbitrary number to shift the scanning frame thereon.

In addition, if an object is detected (branch "Yes" in the step S15), the object detection apparatus 100 performs detection of an object which is corresponded to the concerned detected object (or "each object" if a plurality of objects is detected) and which may appear relatively thereto (step S16). Further, when a relatively appearing object is detected, if an object which may appear further relatively to the concerned object is described in the object candidate area information 106, then the object detection process is recursively performed (step S17). Finally, processes such as described above are executed regarding every discriminator described in the object candidate area information 106 (step S18).

It should be noted that the object candidate area information 106 is regularly updated. That is, the candidate area calculator 105 calculates a new object candidate area information 106 on a basis of the object detection information 104 calculated from images acquired in the operation phase and updates the object candidate area information 106 calculated previously to the newly calculated object candidate area information 106. Thus, the movie data taken during the operation of the system is divided by unit of frame and diverted to the image group for learning 201. That is, the movie which has been taken is used in the learning phase, separately to the actual operation phase. For example, a period is determined to one week or the like, an image group accumulated during the concerned period is re-learned to re-generate the object candidate area information 106 and the information to be used in the operation phase is updated.

As described above, the object detection apparatus 100 related to the first example embodiment performs operations related to two phases which are the learning phase and the operation phase. In the learning phase, a discriminator for each object and/or state is applied to a past fixed-point image group by scanning the entire image by sliding window method, and investigations about an object of which state was reflected to which location in an image is performed (object detection information 104 is generated). Next, the object candidate area information 106 of each object and/or state is calculated on a basis of the object detection information 104 by use of existing machine-learning technology.

In the operation phase, a detection process is actually performed on a basis of the object candidate area information 106 calculated in the learning phase by limiting an area of applying the discriminator. In addition, collecting of new fixed-point images continues during the operation, learning is performed in relation with the concerned image group and re-calculation and update of the object candidate area information 106 are performed.

In the case of the object detection apparatus 100 related to the first example embodiment, time (effort) for manual operations is saved because candidate areas for detecting objects from images are automatically specified. In addition, since the specification of candidate areas is set by use of past images (past achievement), the areas are set more appropriately than manually specifying candidate areas. That is, probability of wasting scanning time of discriminators, missing necessary object detection, and the like can be reduced. Further, since the candidate areas are regularly and automatically updated to optimal ones, no manual re-specification is needed and appropriate response can be performed related to changes of situation in shooting places.

Second Example Embodiment

Next, a second example embodiment will be described in detail by referring to drawings.

In the second example embodiment, various parameters can be set when applying discriminators, in addition to the explanation of the first example embodiment. By configuring various parameters at the time of applying discriminators to be configurable, differences of those parameters during machine-learning of the candidate area calculator 105 will be learned at same time and optimal parameters will be selected. As a result, according to the second example embodiment, a burden for exploring optimal parameters will be reduced.

Figure 13:
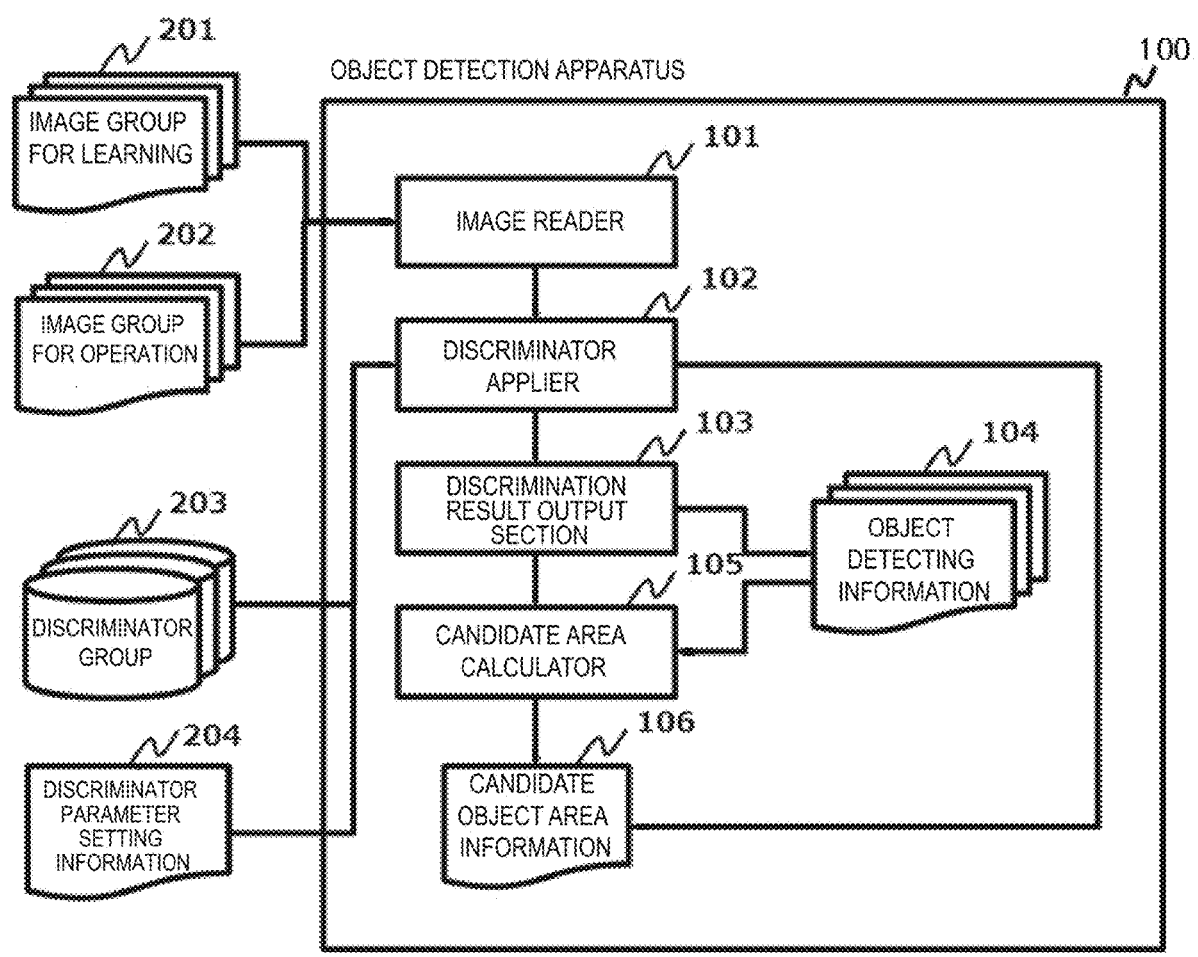
FIG. 13 is a diagram showing an example of an internal configuration of an object detection apparatus related to a second example embodiment.

FIG. 13 is a diagram showing an example of an internal configuration of an object detection apparatus 100 related to the second example embodiment. By referring FIG. 13, a discriminator parameter setting information 204 is added, compared to the object detection apparatus 100 explained in the first example embodiment. More precisely, the discriminator applier 102 is configured to be able to refer to the discriminator parameter setting information 204 stored in the storage medium or the like.

Variations of parameters at the time of applying discriminators while learning are described in the discriminator parameter setting information 204. FIG. 14 is a diagram showing an example of a discriminator parameter setting information 204 related to the second example embodiment. In the discriminator parameter setting information 204 shown in FIG. 14, a scanning width when scanning images with a sliding window is specified to each object. Since three types of horizontal scanning width and two types of vertical scanning width are described in the example of FIG. 14, six types (3 by 2) of sliding windows are used when applying discriminators while learning of the candidate area calculator 105.

It should be noted that although there is no description about a parameter "overall" related to every object in FIG. 14, if a specification about the concerned parameter is performed, then a number of combinations will be doubled accordingly. Alternatively, parameters may be separately set for each state of objects.

The discriminator applier 102 refers to the discriminator parameter setting information 204, applies discriminators to images and as a result obtains object detection information 104 as shown in FIG. 15. By comparing with the object detection information 104 related to the first example embodiment (refer to FIG. 7), the object detection information 104 in FIG. 15 is added with columns of "Scanning Width (Horizontal)" and "Scanning Width (Vertical)" and it can be understood with which parameter combination the discriminator is applied.

The candidate area calculator 105 performs machine-learning by use of the concerned information and selects an optimal parameter (size of sliding window) to calculate the candidate area.

It should be noted that as a method of selecting the parameter it can be considered a method in which a portion of the image group for learning 201 (for example, 20% of the whole) is not used as data for learning but is separated as evaluation data and parameters are selected in accordance with results of actually performing detection by use of the concerned evaluation data. Specifically, object detection related to evaluation data is performed by use of candidate area formula as a result of learning with each combination of parameters (six types in the above described example) and the one with the best accuracy is adopted.

The candidate area calculator 105 generates object candidate area information 106 as shown in FIG. 16 by use of object detection information 104 shown in FIG. 15. By referring FIG. 16, the object candidate area information 106 (FIG. 8) is added with columns of "Scanning Width (horizontal)" and "Scanning Width (vertical)", similarly to the object detection information 104, compared to the one explained in the first example embodiment.

Thus, optimal values among applicable combinations of parameters are described for each discriminator in the object candidate area information 106 related to the second example embodiment. During the operation phase, the discriminator applier 102 uses parameters described in the object candidate area information 106 to apply to discriminators.

As described above, in the second example embodiment, the discriminator applier 102 changes parameters within a range predetermined at the time of applying discriminators in learning phase and calculates object detection information 104 including parameters at the time of object detection. The candidate area calculator 105 performs a machine-learning related to object detection information including parameters at the time of calculation of the object and calculates object candidate area information including information specifying parameters (two scanning width fields in the example of FIG. 16) at the time of applying a candidate area to a discriminator. That is, the object detection apparatus 100 related to the second example embodiment configures various parameters to be configurable at the time of applying discriminators and learns difference of those parameters during the machine-learning at the same time. As a result of learning, parameters optimal for object detection are selected and applied to discriminators. As a result, accuracy of object detection improves.

In the plurality of flowcharts used in the above explanation of example embodiments, a plurality of steps (processes) are described in order, while the executing order of steps to be executed in each example embodiment is not limited to the described order. In each example embodiment, the order of illustrated steps can be changed within a range that does not affect their content, such as executing each process in parallel for example. In addition, each of the above described example embodiments can be combined within a range that does not affect their content.

Figure 17:
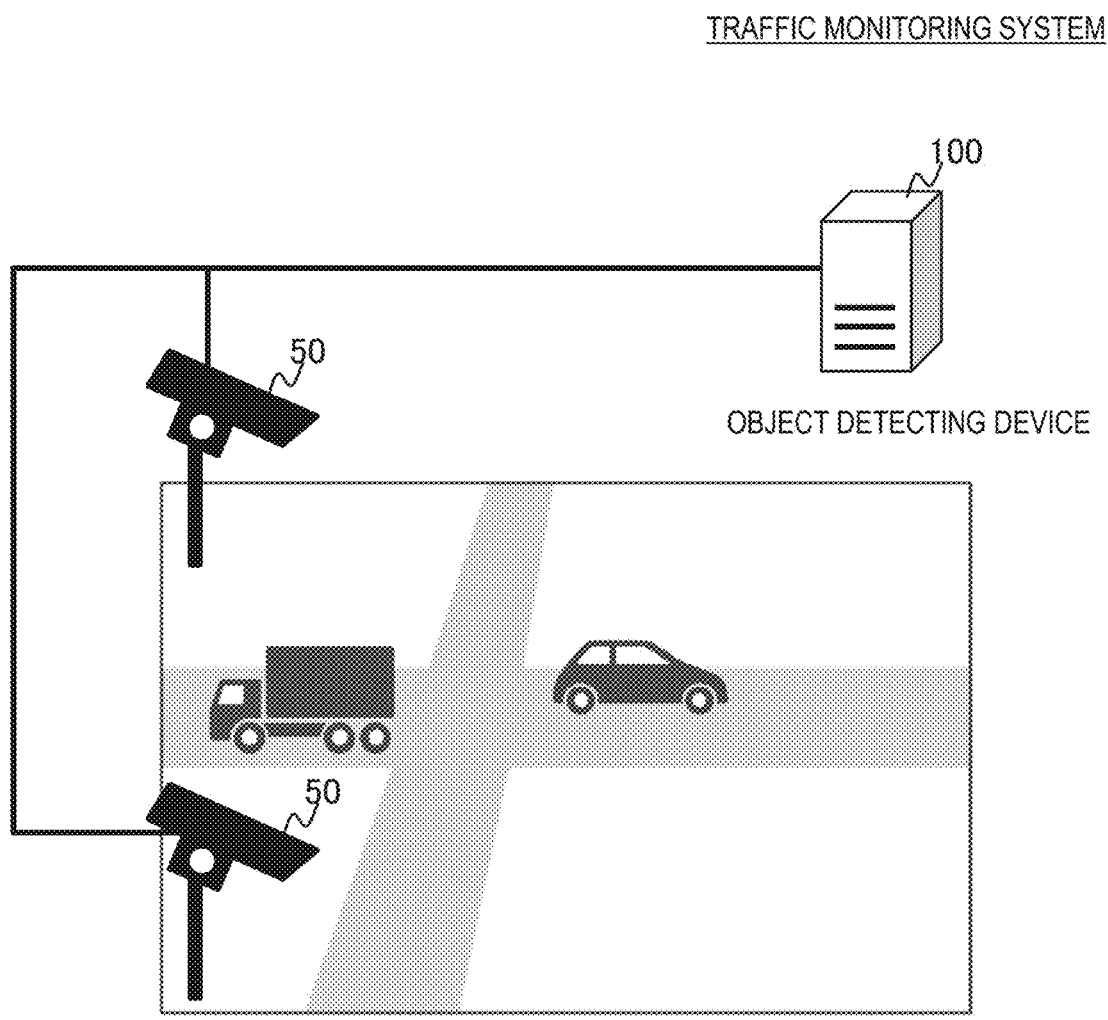
FIG. 17 is a diagram showing an example of a configuration of a traffic monitoring system including the object detection apparatus.

Although the industrial applicability of the present invention is evident by above described explanation, the present invention is suitably applicable to a traffic monitoring system using a monitoring camera. For example, as shown in FIG. 17, the traffic monitoring system includes a plurality of monitoring cameras 50 and an object detection apparatus 100 which detects objects from image data acquired by the monitoring cameras 50. By installing the plurality of monitoring cameras 50 in intersections and the like and by monitoring only candidate areas limited in each shooting place of the monitoring cameras, the concerning traffic monitoring system can speed up monitoring process to perform object detection.

A part or the whole of the above described example embodiments may be described as following modes too, however are not limited to the following.

Mode 1

It is same as the object detection apparatus according to the above first aspect.

Mode 2

The object detection apparatus of the Mode 1,
wherein, in an operation phase of detecting an object from an acquired image, the discriminator applier applies the discriminator to the acquired image by limiting to an area which is determined by the candidate area.

Mode 3

The object detection apparatus of the Mode 2,
wherein the candidate area calculator calculates a new one of the object candidate area information based on the object candidate detection information calculated based on an image acquired in the operation phase and updates the object candidate area information based on the newly calculated object candidate area information.

Mode 4

The object detection apparatus of the Mode 2 or 3,
wherein the candidate area calculator calculates the object candidate area information which associates an object, a condition valid for a discriminator to detect the object and the candidate area;
wherein the discriminator applier selects an image which satisfies the condition valid among the images acquired in the operation phase and applies a discriminator by limiting an area determined by the candidate area among areas in the selected image.

Mode 5

The object detection apparatus of the Mode 4,
wherein the condition valid is a condition related to a time the image has been acquired in the operation phase.

Mode 6

The object detection apparatus of any of the Modes 1 to 5,
wherein the candidate area calculator calculates the object candidate area information including information to determine a discriminator to detect a second object which occurs based on a detection of a first object, and wherein the discriminator applier applies, after the first object has been detected, a discriminator to detect the second object to an image.

Mode 7

The object detection apparatus of any of the Modes 1 to 6,
wherein the discriminator applier changes a parameter within a predetermined range at a time of applying the discriminator, in the learning phase, and calculates the object detection information including a parameter at a time of the detection of the object, and
wherein the candidate area calculator performs a machine-learning related to an object detection information including the parameter at a time of the calculation of the object and calculates the object candidate area information including information specifying parameters at a time of applying the candidate area to the discriminator.

Mode 8

It is same as the traffic monitoring system according to the above described second aspect.

Mode 9

It is same as the method of controlling an object detection apparatus according to the above described third aspect.

Mode 10

It is same as the program according to the above described fourth aspect.

It should be noted that the Modes 8 to 10 can be developed with the Modes 2 to 7, similarly to the Mode 1.

It should be noted that each disclosure of the above described cited patent literatures is incorporated by reference in the present document. Example embodiments and examples can be changed and/or adjusted within the ambit of all disclosure of the present invention (including claims) and further on a basis of basic technical concept. In addition, various combinations or selections of various disclosed components (including each component in each claim, each component in each example embodiment or each example, each component of each drawings and the like) is possible within the frame of all disclosure of the present invention. That is, the present invention of course includes each type of variations and modifications that a skilled person in the art could made in accordance with all disclosure including claims and technical concept. Especially, it should be interpreted that any numeral value and/or any sub-range included in numeral ranges disclosed in the present document is specifically described even if not explicitly described.

REFERENCE SIGNS LIST 10, 100 object detection apparatus
11, 102 discriminator applier
12, 105 candidate area calculator
21 CPU
22 memory
23 input/output interface
24 NIC
31 scanning frame
32, 33, 36 area
34 signboard
35 automobile
41-44 point
50 monitoring camera
101 image reader
103 discrimination result output section
104 object detecting information
106 candidate object area information
201 image group for learning
202 image group for operation
203 discriminator group
204 discriminator parameter setting information

What is claimed is:

1. An object detection apparatus comprising:
at least a processor; and
a memory in circuit communication with the processor,
wherein the processor is configured to execute program instructions stored in the memory to implement:
a discriminator applier configured to apply a discriminator which detects an object to images acquired in past and calculate object detection information which include at least location information of the object detected by the discriminator, in a learning phase; and
a candidate area calculator configured to perform a machine-learning by use of the object detection information and calculate an object candidate area information which includes at least information specifying a candidate area in which the object may appear in an image,
wherein the discriminator applier changes a parameter within a predetermined range at a time of applying the discriminator, in the learning phase, and calculates the object detection information including a parameter at a time of the detection of the object, and
wherein the candidate area calculator performs a machine-learning related to object detection information including the parameter at a time of the calculation of the object and calculates the object candidate area information including information specifying parameters at a time of applying the candidate area to the discriminator.

2. The object detection apparatus according to claim 1,
wherein, in an operation phase of detecting an object from an acquired image, the discriminator applier applies the discriminator to the acquired image by limiting to an area which is determined by the candidate area.

3. The object detection apparatus according to claim 2,
wherein the candidate area calculator calculates a new one of the object candidate area information based on the object candidate detection information calculated based on an image acquired in the operation phase and updates the object candidate area information based on the newly calculated object candidate area information.

4. The object detection apparatus according to claim 2,
wherein the candidate area calculator calculates the object candidate area information which associates an object, a valid condition for a discriminator to detect the object and the candidate area;
wherein the discriminator applier selects an image which satisfies the condition valid among the images acquired in the operation phase and applies a discriminator by limiting an area determined by the candidate area among areas in the selected image.

5. The object detection apparatus according to claim 4,
wherein the valid condition is a condition related to a time the image has been acquired in the operation phase.

6. The object detection apparatus according to claim 1, wherein the candidate area calculator calculates the object candidate area information including information to determine a discriminator to detect a second object which occurs based on a detection of a first object, and wherein the discriminator applier applies, after the first object has been detected, a discriminator to detect the second object to an image.

7. A traffic monitoring system including:
a monitoring camera; and
an object detection apparatus configured to detect an object in an image data acquired by the monitoring camera,
wherein the object detection apparatus comprises:
at least a processor; and
a memory in circuit communication with the processor, wherein the processor is configured to execute program instructions stored in the memory to implement:
a discriminator applier configured to apply a discriminator which detects an object to images acquired in past and calculate object detection information which include at least location information of the object detected by the discriminator, in a learning phase; and
a candidate area calculator configured to perform a machine-learning by use of the object detection information and calculate object candidate area information which includes at least information specifying a candidate area in which the object may appear in an image,
wherein the discriminator applier changes a parameter within a predetermined range at a time of applying the discriminator, in the learning phase, and calculates the object detection information including a parameter at a time of the detection of the object, and
wherein the candidate area calculator performs a machine-learning related to object detection information including the parameter at a time of the calculation of the object and calculates the object candidate area information including information specifying parameters at a time of applying the candidate area to the discriminator.

8. The traffic monitoring system according to claim 7, wherein, in an operation phase of detecting an object from an acquired image, the discriminator applier applies the discriminator to the acquired image by limiting to an area which is determined by the candidate area.

9. The traffic monitoring system according to claim 8, wherein the candidate area calculator calculates a new one of the object candidate area information based on the object candidate detection information calculated based on an image acquired in the operation phase and updates the object candidate area information based on the newly calculated object candidate area information.

10. The traffic monitoring system according to claim 8, wherein the candidate area calculator calculates the object candidate area information which associates an object, a valid condition for a discriminator to detect the object and the candidate area;
wherein the discriminator applier selects an image which satisfies the condition valid among the images acquired in the operation phase and applies a discriminator by limiting an area determined by the candidate area among areas in the selected image.

11. The traffic monitoring system according to claim 10, wherein the valid condition is a condition related to a time the image has been acquired in the operation phase.

12. The traffic monitoring system according to claim 7, wherein the candidate area calculator calculates the object candidate area information including information to determine a discriminator to detect a second object which occurs based on a detection of a first object, and wherein the discriminator applier applies, after the first object has been detected, a discriminator to detect the second object to an image.

13. A method of controlling an object detection apparatus, comprising:
applying a discriminator which detects an object to images acquired in past and calculating object detection information which includes at least a location information of the object detected by the discriminator, in a learning phase;
performing a machine-learning by use of the object detection information and calculating object candidate area information which includes at least information specifying a candidate area in which the object may appear in an image;
changing a parameter within a predetermined range at a time of applying the discriminator, in the learning phase, and calculates the object detection information including a parameter at a time of the detection of the object, and
performing a machine-learning related to object detection information including the parameter at a time of the calculation of the object and calculates the object candidate area information including information specifying parameters at a time of applying the candidate area to the discriminator.

14. The method of controlling an object detection apparatus according to claim 13, comprising:
applying the discriminator to an acquired image by limiting to an area which is determined by the candidate area, in an operation phase.

15. The method of controlling an object detection apparatus according to claim 14, comprising:
calculating a new one of the object candidate area information based on the object candidate detection information calculated based on an image acquired in the operation phase and updates the object candidate area information based on the newly calculated object candidate area information.

16. The method of controlling an object detection apparatus according to claim 14, comprising:
calculating the object candidate area information which associates an object, a valid condition for a discriminator to detect the object and the candidate area;
selecting an image which satisfies the condition valid among the images acquired in the operation phase and applies a discriminator by limiting an area determined by the candidate area among areas in the selected image.

17. The method of controlling an object detection apparatus according to claim 13, comprising:
calculating the object candidate area information including information to determine a discriminator to detect a second object which occurs based on a detection of a first object, and
applying a discriminator to detect the second object to an image, after the first object has been detected.

* * * * *